(12) United States Patent
Liou

(10) Patent No.: US 6,941,147 B2
(45) Date of Patent: Sep. 6, 2005

(54) GPS MICROPHONE FOR COMMUNICATION SYSTEM

(76) Inventor: Henry Liou, 480 Apollo St., Suite E, Brea, CA (US) 92821

( * ) Notice: Subject to any disclaimer, the term of this patent is extended or adjusted under 35 U.S.C. 154(b) by 0 days.

(21) Appl. No.: 10/377,566

(22) Filed: Feb. 26, 2003

(65) Prior Publication Data

US 2004/0164893 A1 Aug. 26, 2004

(51) Int. Cl.[7] .................................. H04Q 7/20
(52) U.S. Cl. .................. 455/456.5; 455/404.2; 342/357.01; 701/201
(58) Field of Search ............... 455/404.2, 456.1, 455/456.5, 456.6, 9, 12.1, 467; 342/357.01, 357.12, 357.11; 701/201, 213

(56) References Cited

U.S. PATENT DOCUMENTS 6,011,510 A * 1/2000 Yee et al. .............. 342/357.09
6,459,371 B1 * 10/2002 Pike .......................... 340/539.1
2001/0014597 A1 * 8/2001 Takiguchi et al. ........... 455/343
2002/0186164 A1 * 12/2002 Hsu et al. ............... 342/357.09

* cited by examiner

Primary Examiner—Nay Maung
Assistant Examiner—Edan Orgad
(74) Attorney, Agent, or Firm—Raymond Y. Chan; David and Raymond

(57) ABSTRACT

A GPS microphone, which is adapted for incorporating a communication system, includes a speaker-microphone set, a radio frequency transmitter communicatively networked with the communication system through radio frequency signals, and a GPS controller electrically connected with the radio frequency transmitter to encode a positioning data into a RF positioning signal in form of audio signal wherein when the GPS controller is triggered, the radio frequency transmitter is activated to transmit RF positioning signal to the communication system.

10 Claims, 3 Drawing Sheets

US 6,941,147 B2

GPS MICROPHONE FOR COMMUNICATION SYSTEM

BACKGROUND OF THE PRESENT INVENTION

1. Field of Invention

The present invention relates to a communication system, and more particularly to a GPS microphone for a communication system, wherein the GPS microphone is capable of sending out positioning data in form of an audio signal to a control center such that the GPS microphone supports both the communication provision and the position location provision.

2. Description of Related Arts

Communication devices, such as cellular phone, satellites phone and "Pocket PC", are considered as one of the common communication tools, wherein a user is able to wirelessly communicate with another user by means of the communication device via a public network. A communication device generally comprises a microphone speaker and a modem connected with the microphone speaker in such a manner that when the microphone speaker receives an audio signal, the audio signal is encoded to a digital data and sent out in a wireless manner.

Nowadays, the communication devices can be incorporated with a Global Positioning System (GPS) for tracking the location of the user, wherein the common GPS generally comprises a built-in GPS receiver equipped with the modem to wirelessly send out a positioning data through the communication device. In order to receive the GPS positioning data, the communication device must employ a processor unit arranged in such a manner that after the processor unit receives the positioning data, the positioning data is decoded to a readable data so that the user is able to locate the position of the sender.

However, such GPS incorporated communication device has several drawbacks. The communication device must be employed with the modem for wirelessly transmitting both the audio signal and the positioning data, which will highly increase the manufacturing cost of the communication device. Furthermore, the data transmission speed of the modem is inconsistent such that there is always a delay when both the audio signal and the positioning data are sent out.

In addition, some low-end communication devices, which is using a radio frequency, such as radios and Walkie-Talkie, cannot incorporate with the GPS since the radio frequency does not required such modem for signal transmission. Therefore, the GPS must be independently installed to provide positioning data.

For example, while patrolling, police officers or security officers generally must arm with a radio frequency communication device to keep contact with the control center. For safety and arrangement purposes, their locations are preferred to be tracked by the control center so that the control center can give assistance to them in case of emergency. However, the police officers or the security officers must carry an additional GPS device in order to send out the positioning signal to the control center. In other words, the additional GPS device will increase the load of the police officers or the security officers while patrolling.

SUMMARY OF THE PRESENT INVENTION

A main object of the present invention is to provide a GPS microphone for a communication system, wherein the GPS microphone is capable of sending out positioning data in form of an audio signal to a control center such that the GPS microphone supports both the communication provision and the position location provision.

Another object of the present invention is to provide a GPS microphone for a communication system, wherein the positioning data is transmitted through a radio frequency so as to provide an instant positioning location to the communication system in a wireless communication manner.

Another object of the present invention is to provide a GPS microphone for a communication system, wherein a conventional microphone can be upgraded to form the GPS microphone without modifying the original radio frequency transmitting system of the conventional microphone and the communication system, so as to minimize the manufacturing cost of the communication system incorporating with the GPS microphone.

Another object of the present invention is to provide a GPS microphone for a communication system, which successfully provides an economic and efficient solution for transmitting the positioning data from the GPS microphone to the communication system through the radio frequency.

Accordingly, in order to accomplish the above objects, the present invention provides a GPS microphone for a communication system, comprising a speaker-microphone set, a radio frequency transmitter communicatively networked with the communication system through radio frequency signals, and a GPS controller electrically connected with the radio frequency transmitter to encode a positioning data into a RF positioning signal in form of audio signal wherein when the GPS controller is triggered, the radio frequency transmitter is activated to transmit RF positioning signal to the communication system.

In addition, the present invention further provides a process of transmitting a positioning data to a communication system from a GPS microphone which comprises a speaker-microphone set, a radio frequency transmitter and a GPS controller, the process comprising the steps of:

(a) communicatively networking the radio frequency transmitter to the communication system through radio frequency signals;

(b) activating the GPS controller to encode the positioning date into a RF positioning signal in form of audio signal; and (c) activating the radio frequency transmitter to transmit the RF positioning signal to the communication system.

These and other objectives, features, and advantages of the present invention will become apparent from the following detailed description, the accompanying drawings, and the appended claims.

DETAILED DESCRIPTION OF THE PREFERRED EMBODIMENT

Figure 1:
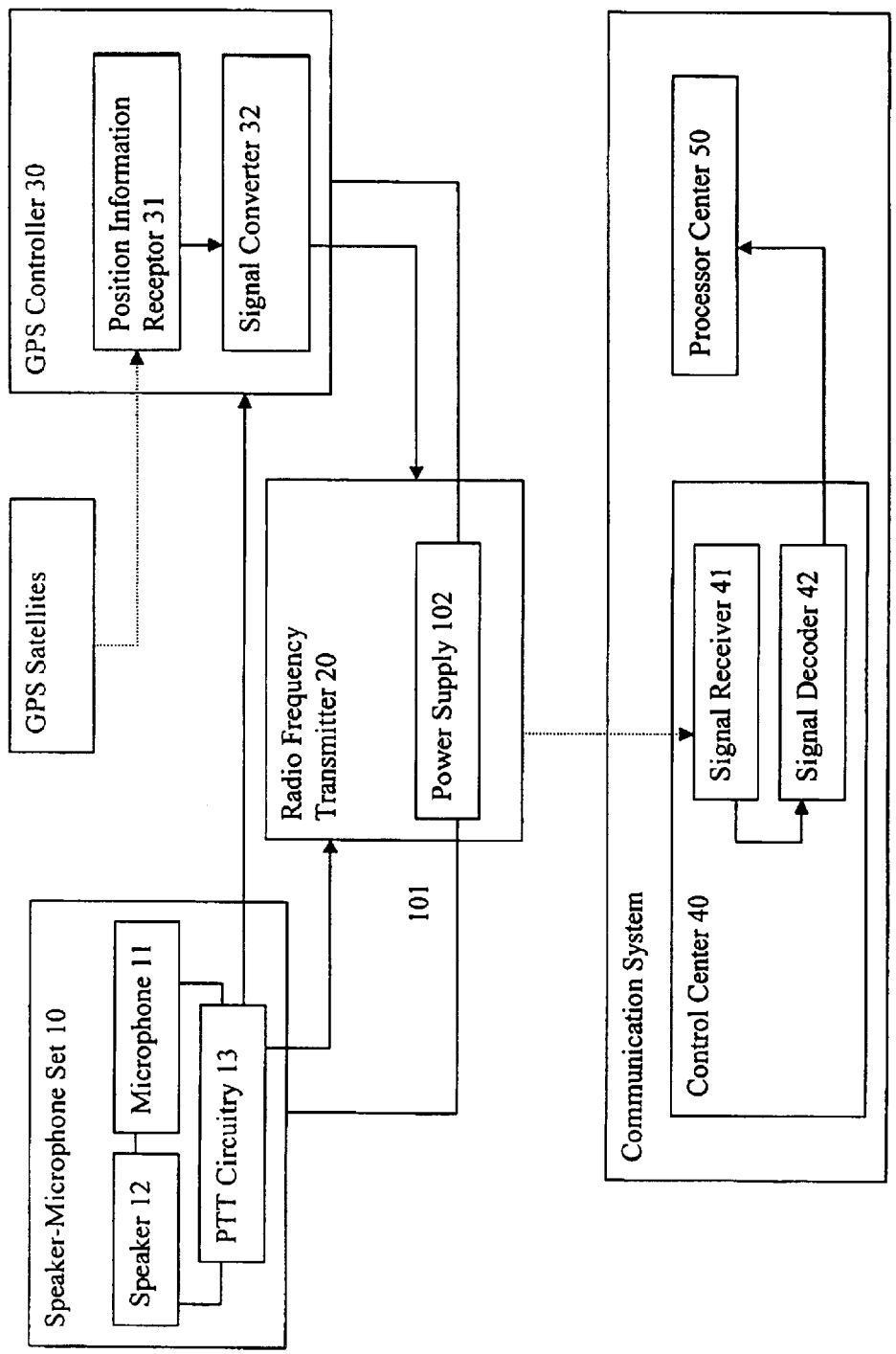
FIG. 1 is a block diagram of a GPS microphone for a communication system according to a preferred embodiment of the present invention.
Figure 2:
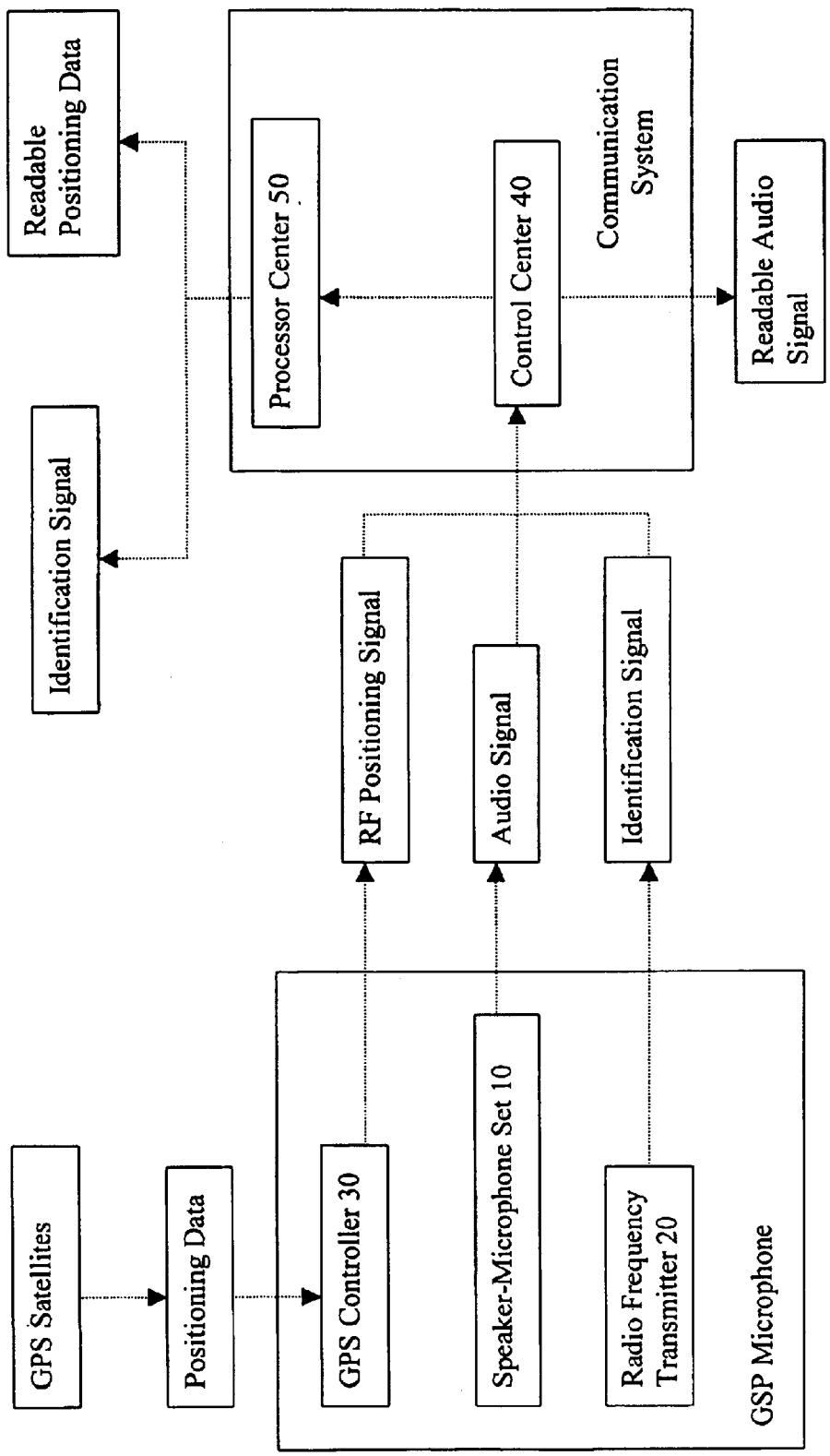
FIG. 2 is a flow chart for transmitting a positioning data from the GPS microphone for the communication system according to the preferred embodiment of the present invention.
Figure 3:
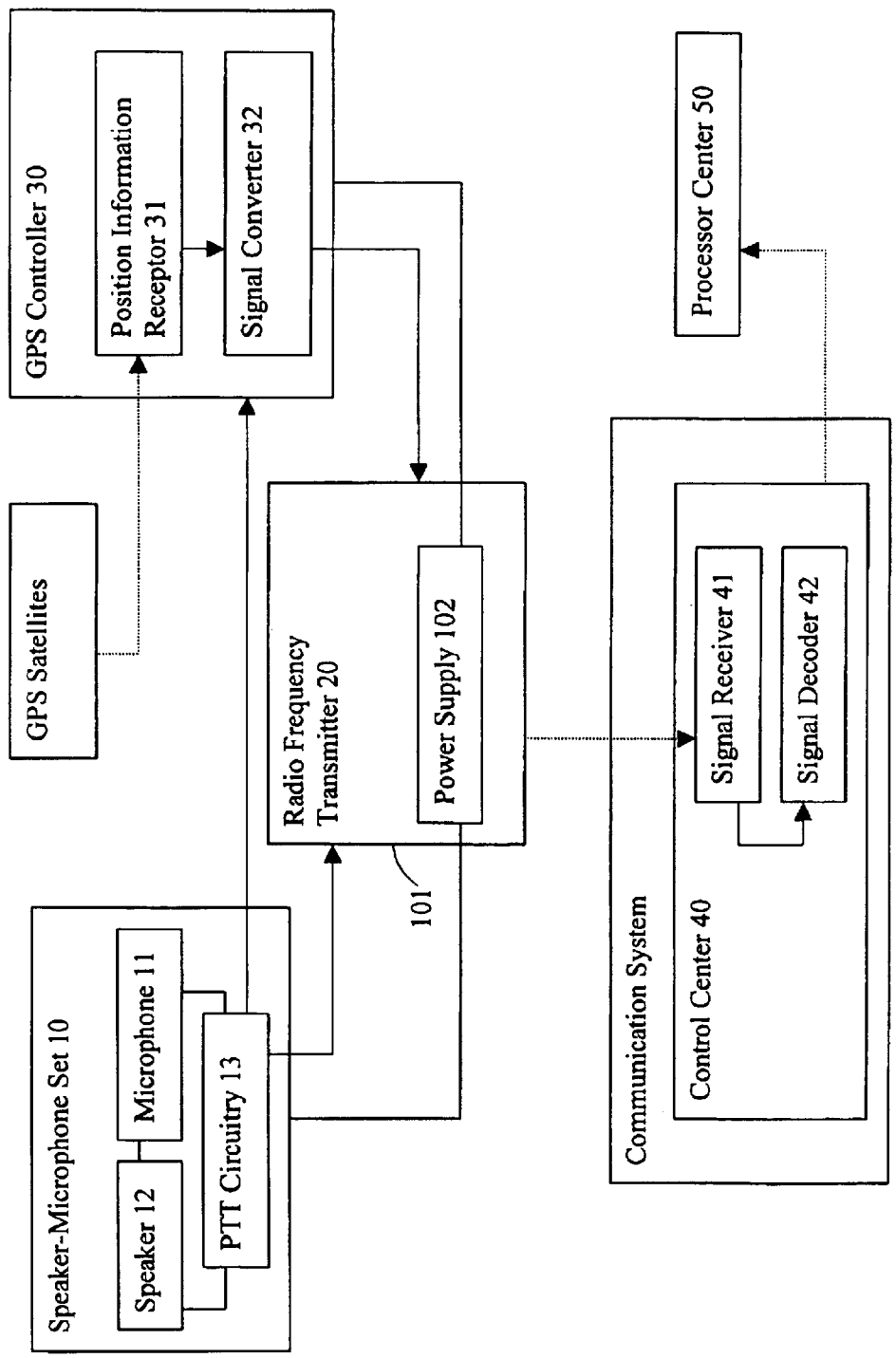
FIG. 3 illustrates an alternative mode of the communication system according to the above preferred embodiment of the present invention.

Referring to FIGS. 1 to 3 of the drawings, a GPS microphone for a communication system according to a preferred embodiment of the present invention is illustrated, wherein the GPS microphone comprises a speaker-microphone set 10, a radio frequency transmitter 20 communicatively networked with the communication system through radio frequency signals, and a GPS controller 30 electrically connected with the radio frequency transmitter 20 to encode a positioning data into a RF positioning signal in form of audio signal, wherein when the GPS controller 30 is triggered, the radio frequency transmitter 20 is activated to transmit RF positioning signal to the communication system.

The speaker-microphone set 10 comprises a microphone 11, a speaker 12, and a PTT (push-to-talk) circuitry 13 arranged in such a manner that when the PTT circuitry 13 is triggered to activate the microphone 11 in a transmit mode, the microphone 11 is capable of receiving and encoding a voice message into an audio signal.

According to the preferred embodiment, the speaker-microphone set 10 can be a conventional push-to-talk wireless communication system, such as a two-way radio system, wherein when the PTT circuitry 13 is triggered, the microphone 11 is ready to receive the audio signal and transmit the audio signal to the communication system through the radio frequency transmitter 20.

The radio frequency transmitter 20 of the GPS microphone is a radio frequency transmitting device adapted to send and receive the radio frequency, wherein the radio frequency transmitter 20 functions as a wireless communication link between the GPS microphone and the communication system. Accordingly, when the communication system is a two-way radio system, the radio frequency transmitter 20 can be a data packet modem, such as a half-duplex data modem, to transmit the audio signal from the GPS microphone to the communication system.

The radio frequency transmitter 20 can be automatically or manually tuned to communicate with another communication system by matching the same radio frequency. In other words, more than one GPS microphone can be set to use the same radio frequency by the manufacturer or security service company. Alternatively, the user is also able to manually tune the radio frequency transmitter 20 to communicatively network with another desirable communication system or automatically tune the radio frequency transmitter 20 to search another communication system that is positioned within the coverage area with respect to communication system.

The GPS controller 30 comprises means 31 for receiving the positioning data from an external position transponder system, such as an external GPS satellites, and a signal converter 32 arranged to convert the positioning data into the RF positioning signal, wherein the RF positioning signal is transmitted to the communication system through the radio frequency transmitter 20.

The receiving means 31 according to the preferred embodiment is a position information receptor, such as a GPS antenna, adapted for wirelessly communicating with the GPS satellites so as to receive the positioning date therefrom. The receiving means 31 performs physical interface layer processing, correlates the data, and provides it through a component interface with a particular format and protocol. The cited example with the GPS controller 30 assumes NMEA-0183 message formats. However, alternative GPS message formats, such as Trimble's proprietary TSIP format, would also apply. Also, besides GPS, other positioning systems, such as IMU, are also supported by the architecture.

The GPS microphone further comprises a portable case 101 to receive the radio frequency transmitter 20, the GPS controller 30, and a power source 102 providing electrical power supply to the speaker-microphone set 10, the radio frequency transmitter 20, and the GPS controller 30. Accordingly, the power source 102 of the GPS microphone comprises a rechargeable battery disposed in the portable case 101 wherein the rechargeable battery is electrically connected to speaker-microphone set 10 to supply electricity.

As shown in FIG. 2, the present invention further provides a process of transmitting the positioning data from the GPS microphone to the communication system, which comprises the following steps.

(1) Communicatively network the radio frequency transmitter 20 to the communication system through radio frequency signals.

(2) Activate the GPS controller 30 to encode the positioning date into the RF positioning signal in form of audio signal.

(3) Activate the radio frequency transmitter 20 to transmit the RF positioning signal to the communication system.

In step (1), the communication system should provide a coverage area wherein when the radio frequency transmitter 20 is located within the coverage area, the GPS microphone is capable of communicatively networking with the communication system. Once the communication connection is established, the radio transmitter 20 is capable of not only sending out the audio signal from the speaker-microphone set 10 but also transmitting the RF positioning signal from the GPS controller 30.

In step (2), the GPS controller 30 can be activated when the PTT circuitry 13 of the speaker-microphone set 10 is triggered wherein the audio signal from the speaker-microphone set 10 is combined with the RF positioning signal from the GSP controller 30 to form an information signal so as to transmit to the communication system through the radio frequency transmitter 20. In other words, once the user triggers the PTT circuitry 13 to communicate with the communication system, the GPS controller 30 is automatically activated to receive the positioning data and to encode the positioning data into the RF positioning signal so as to send out the information signal having the RF positioning signal and the audio signal via the radio frequency transmitter 20. In addition, the communication system is preferably recorded the information signal from the GPS microphone as a positioning location history for safety purpose.

Accordingly, the radio frequency transmitter 20 further generates an identification signal, which is in form of the audio signal, with respect to the speaker-microphone set 10 wherein when the RF positioning signal is transmitted from the radio frequency transmitter 20, the identification signal is combined with the RF positioning signal to transmit to the communication system. The main purpose of the identification signal is to identify the respective GPS microphone when more than one GPS microphones are used at the same time. In other words, the radio frequency transmitter 20 is arranged to transmit the information signal which comprises the audio signal, the RF positioning signal, and the identification signal to the communication system.

Alternatively, the GPS controller 30 can be preset to be automatically activated for receiving the positioning data for a predetermined period of time in the step (2). For example, the user is able to preset the GPS controller 30 to receive the positioning data for every ten minutes in such a manner that once the GPS controller 30 encodes the RF positioning signal, the radio frequency transmitter 20 is ready to transmit the RF positioning signal to the communication system even there is no audio signal received from the speaker-microphone set 10.

In addition, the GPS controller 30 is activated when a request is sent from the communication system. Accordingly, the request is a RF signal sent from the communication system and is received by the radio frequency transmitter 20 wherein the request is arranged to automatically activate the GPS controller 30 receive the positioning data so as to transmit the RF positioning signal to the communication system as a feedback. It is important that when the user is unable to activate the GPS controller 30, the communication system is capable of remotely controlling the activation of the GPS controller 30 to track the positioning location of the user. Furthermore, the GPS controller 30 can be manually activated by the user by simply switching on the GPS controller 30, such as pressing an activation button of the GPS controller 30.

The communication system, according to the preferred embodiment, comprises a control center 40 which comprises means 41 for receiving the information signal from the GPS microphone and means 42 for decoding the information signal from the receiving means 41, and a processor center 50 converting the RF positioning signal back to the positioning data. The receiving means 41 is a signal receiver to communicatively network with the GPS microphone through the radio frequency signals.

The decoding means 42 is a signal decoder adapted for decoding the information signal received by the receiving means 41. Accordingly, when the information signal, which is combined the audio signal, the RF positioning signal, with the identification signal, is received by the receiving means 41, the decoding means 42 is arranged to decode the audio signal to a readable audio data while the RF positioning signal and the identification signal are then transmitted to the processor center 50.

Accordingly, the processor center 50 is arranged to convert the RF positioning signal into a readable positioning data in such a manner that the communication system is adapted to identify the respective GPS microphone through the identification signal and locate the position of the GPS microphone according to the readable positioning data. It is worth to mention that when the GPS controller 30 of the GPS microphone is preset to be activated for a period of time, only the RF positioning signal and the identification signal are transmitted to the signal processor 50 while no audio signal is decoded into the readable audio data.

FIG. 1 illustrates am example of a use of the GPS microphone. For example, while patrolling, the police officer should carry the GPS microphone wherein the communication system is installed into the vehicle. Once the communication network is established between the radio frequency transmitter 20 and the communication system, the GPS microphone is capable of transmitting the RF positioning signal to the communication system through the radio frequency transmitter 20. Therefore, another police officer in the vehicle is able to keep track the location of the police officer carrying the GPS microphone.

FIG. 3 illustrates another example of the GPS microphone, wherein the control center 40 is installed into the vehicle while the processor center 50 is located at the police station in such a manner that the police office carrying the GPS microphone is able to communicate with the police office in the vehicle as a conventional two-way radio system while the positioning data is transmitted from the GSP microphone to the processor center 50 through the control center 40. In other words, the control center 40 functions as a communication center to the GPS microphone wherein the control center is capable of communicatively networking with the processor center 50 to transmit the positioning data for a long coverage distance.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A GPS communication apparatus for transmitting a positioning data to a communication system, comprising a GPS microphone which comprises:

a speaker-microphone set which comprises a microphone, a speaker, and a PTT (Push-To-Talk) circuitry arranged in such a manner that when said PTT circuitry is triggered to activate said microphone in a transmit mode, said microphone is capable of receiving and encoding a voice message into an audio signal;

a radio frequency transmitter communicatively networking with said communication system through radio frequency signals, and a GPS controller electrically connected with said radio frequency transmitter to encode positioning data into one or more RF positioning signals in form of audio signals, wherein when said GPS controller is triggered, said radio frequency transmitter is activated for transmitting said RF positioning signal to said communication system, wherein said GPS controller is activated when said PTT circuitry is triggered in such a manner that said audio signal from said speaker-microphone set and said RF positioning signals from said GPS controller are combined to form an information signal for transmitting to said communication system.

2. The GPS communication apparatus, as recited in claim 1, wherein said radio frequency transmitter further generates an identification signal, which is in form of an audio signal, with respect to said speaker-microphone set, wherein when said RF positioning signals are transmitted from said radio frequency transmitter, said identification signal is combined with said RF positioning signals for transmitting to said communication system.

3. The GPS communication apparatus, as recited in claim 1, wherein said radio frequency transmitter is a radio transmitting device adapted to send and receive said radio frequency, wherein said radio frequency transmitter functions as a wireless communication link between said GPS microphone and said communication system.

4. The GPS communication apparatus, as recited in claim 1, wherein said communication system comprises a control center which comprises a signal receiver communicatively networking with said GPS microphone through said radio frequency signals for receiving said information signal form said GPS microphone, means for decoding said information signal form said receiving means, and a processor center converting said RF positioning signals back to said positioning data.

5. The GPS communication apparatus, as recited in claim 2, wherein said communication system comprises a control center which comprises a signal receiver communicatively networking with said GPS microphone through said radio frequency signals for receiving said information signal form said GPS microphone, means for decoding said information signal form said receiving means, and a processor center converting said RF positioning signals back to said positioning data.

6. The GPS communication apparatus, as recited in claim 3, wherein said communication system comprises a control center which comprises a signal receiver communicatively networking with said GPS microphone through said radio frequency signals for receiving said information signal form said GPS microphone, means for decoding said information signal form said receiving means, and a processor center converting said RF positioning signals back to said positioning data.

7. A process of transmitting a positioning data to a communication system from a GPS microphone which comprises a speaker-microphone set which comprises a PTT circuitry arranged to activate said speaker-microphone set, a radio frequency transmitter and a GPS controller being activated when said PTT circuitry is triggered, wherein the process comprises the steps of:

(a) communicatively networking said radio frequency transmitter to said communication system through radio frequency signals;

(b) encoding positioning data, by said GPS controller, into one or more RF positioning signals in form of audio signals; and (c) activating said radio frequency transmitter to transmit said RF positioning signals to said communication system.

8. The process, as recited in claim 7, wherein the step (c) further comprises a step of generating an identification signal, which is in form of audio signal, with respect to said speaker-microphone set, wherein said identification signal is combined with said RF positioning signals to transmit to said communication system when said RF positioning signals are transmitted from said radio frequency transmitter.

9. The process, as recited in claim 8, wherein the step (b) further comprises a step of combining said RF positioning signals with an audio signal from said speaker-microphone set before said RF positioning signals are sent to said communication system.

10. The process, as recited in claim 9, further comprising a step of decoding said RF positioning signals to a readable positioning data at said communication system.

* * * * *